United States Patent [19]

McGinley

[11] 4,030,211
[45] June 21, 1977

[54] INSTRUCTIONAL SYSTEM FOR TEACHING AND TESTING WORD PRONUNCIATION AND SPELLING

[76] Inventor: Edward J. McGinley, 76 Old Hollow Road, Short Hills, N.J. 07078

[22] Filed: Feb. 10, 1976

[21] Appl. No.: 656,853

[52] U.S. Cl. .......................... 35/35 H; 273/130 E
[51] Int. Cl.² .................................. G09B 17/00
[58] Field of Search ............. 35/35 R, 35 H, 31 D, 35/31 F; 273/130 E, 135 B, 135 BC, 135 D, 136 W

[56] References Cited

UNITED STATES PATENTS

| | | | |
|---|---|---|---|
| 1,400,887 | 12/1921 | Liebman | 35/31 D |
| 3,665,618 | 5/1972 | Hahn | 35/35 H |

Primary Examiner—William H. Grieb
Attorney, Agent, or Firm—Kenyon & Kenyon Reilly Carr & Chapin

[57] ABSTRACT

A system is described which comprises a set of complementary charts for teaching and testing word pronunciation and spelling. The set includes a first chart whereupon symbols representing vowel and consonant sounds, are disposed along respective orthogonal edges of a carrier. Positioned at the juncture of imaginary columns and rows emanating from each sound symbol are entries which are sounded by the combination of the corresponding consonant and vowel sounds.

A second chart is provided for test purposes whereupon symbols representing the same vowel and consonant sounds as the first chart are disposed along the same orthogonal edges. Having worked with and studied the first chart, the student is instructed to write in at the juncture of the imaginary columns and rows, or on a separate sheet of paper words which are sounded by the combination of the corresponding consonant and vowel sounds.

A third chart is provided wherein, in addition to the sound symbols positioned along orthogonal axes, additional sound symbols are positioned at the aforementioned junctures. The student employing this chart is asked to sound the word represented by the combination of sounds, and then spell it on a separate sheet of paper.

16 Claims, 15 Drawing Figures

| | ā | ē | ī | ō | | ear | air | | uh | aw | oy | oo |
|---|---|---|---|---|---|---|---|---|---|---|---|---|
| s | say | see | sigh | so | | sear | sayre | | | saw | soy | |
| l | lay | Lee | lie | low | | lear | lair | | | law | Loy | |
| m | may | me | my | mow | | mere | mare | | | maw | | |
| n | ray | knee | nigh | no | | near | Nair | | | gnaw | 29 | |
| f | Fay | fee | fie! | foe | | fear | fair | | | faught | Foy | 26 |
| r | ray | Rhee | rye | row | | rear | rare | | 32 | raw | Roy | 28 |
| t | | tea | tie | toe | | tear | tear | | 34 | taw | toy | |
| h | hay | he | high | hoe | | hear | hair | | huh?! | haw | hoy! | 38 |
| zh | | Gigi | | | | | | | 36 | | | |

Fig. 1.

| | (ā) | (ē) | (ī) | (ō) | (ear) | (air) | | (uh) | (aw) | (oy) | (o͝o) |
|---|---|---|---|---|---|---|---|---|---|---|---|
| (s) | say | see | sigh | so | sear | sayre | | | | saw | soy |
| (l) | lay | Lee | lie | low | lear | lair | | | | law | Loy |
| (m) | may | me | my | mow | mere | mare | | | | maw | |
| (n) | ray | knee | nigh | no | near | Nair | | | | gnaw | |
| (f) | Fay | fee | fie! | foe | fear | fair | | | | faugh! | Foy |
| (r) | ray | Rhee | rye | row | rear | rare | | | | raw | Roy |

| | | | | | | | | | | | |
|---|---|---|---|---|---|---|---|---|---|---|---|
| (t) | | tea | tie | toe | tear | tear | | | | taw | toy |
| (h) | | hay | he | high | hoe | hear | hair | | huh?! | haw | hoy! |

| (zh) | | Gigi | | | | | | | | | |

Fig. 2.

| | (ā) | (ē) | (ī) |
|---|---|---|---|
| (s) | say | see / sea | sigh / Psi |
| (l) | lay / lei | lee / Leigh | |
| (m) | nay / Mae | me / Mimi | |
| (n) | nay / neigh | knee | |

Fig. 3.

| | (ā) | (a) | (aw) | (oy) | (o͝o) | |
|---|---|---|---|---|---|---|
| | ace | | | | | (s) |
| | ail | Al | all | oil | | (l) |
| | aim | am | Aum | | | (m) |
| | ain | | on | | | (n) |

| | | | (ong) | (oing) | | (ng) |
|---|---|---|---|---|---|---|
| | | | | | shush! | (sh) |
| | | | | | | (th) |
| | | | | | | (th) |

Fig. 6.

| ā | face | ī | rice | oo | | s | |
|---|---|---|---|---|---|---|---|
| | safe | | knife | | roof | | f |

Fig. 8.

| ā | slave | ē | sleep | ōō | sleuth smooth | | plume |
|---|---|---|---|---|---|---|---|
| sl | | sm | | | | pl | place please |

Fig. 5.

| | a | laugh | e | sell less | ōō | soon loose | a | safe lace |
|---|---|---|---|---|---|---|---|---|
| s | | wack | | wedge | | woos | w | wave |
| l | | | | | | | | |

Fig. 7.

| | ā | slay sleigh slee | ē | smee smoe | ī | sly slow sloe | ō | |
|---|---|---|---|---|---|---|---|---|
| sl | | | | (smi) | | | | |
| sm | | | | | | | | |
| fl | flay | | flee fly flow | | | | | |

Fig. 4.

| i | uh | aw | | | | s |
|---|---|---|---|---|---|---|
| sis | us | sauce | | | | |
| ill Lil | lull | all awl | | | | l |
| | um mum | Aum Om | | | | m |
| in inn | none nun | on | | | | n |

| | ā | ō |
|---|---|---|
| s | sail sale same sane seine safe save sage sake sate | soul sole sewn soak |
| l | lace lame lane lain lave laze lade laid lake late lathe | los loam lobe load loach loath |

INSTRUCTIONAL SYSTEM FOR TEACHING AND TESTING WORD PRONUNCIATION AND SPELLING

BACKGROUND OF THE INVENTION

This invention relates, generally, to instructional charts and, in particular, to a system of charts which is useful in understanding and speaking a language and, as well, the spelling of words used therein.

In order to be conversational in a language one must know both the meaning of a word and its pronunciation. The word has to make sense within the context of the conversation and it must strike a familiar note with the listener's ear.

The sense or meaning of a word, particularly elementary ones is most readily learned by the child through picture associations and his own life experiences. This is also the case with foreign students learning another language.

The more accomplished students, of course, have mastered the basic vocabulary of the language. They grow in this area with increased reading. Words not recognized are checked out in a dictionary which defines the word in terms of more basic synonyms and word descriptions.

One's ability to pronounce words properly, comes from constant exposure to their pronunciation by others and by comparing them to others already known, containing the same letters or groupings of letters. In time it is recognized that the same letter can have two or more different sounds or in fact, no sound at all, depending on its position in the word and the letters immediately preceding or following it. It also becomes apparent that the same sound is attributed to different groupings of letters.

These variations to the beginner, whatever his age, produce considerable confusion and delay the learning process. Further, without some organized, scientific approach, directed to understanding of letter groupings and attributed sounds, no matter how many times he has experienced a sound and associated that sound with a particular letter, it is quite possible that he will have difficulty correctly pronouncing a "new" word containing that letter or letter grouping.

Guides to pronunciation have been developed. Most dictionaries have devised their own scheme. E.G., G & C Merriam Company has prepared a list of pronunciation symbols which appears in tabulated form at the front of its Merriam-Webster dictionaries.

This is an "alphabetical" arrangement of phonetic symbols comprised of characters, alone or in groupings which have been selected to signify the sounds associated with particular letters and letter combinations of the alphabet, as they are used in particular words.

Alongside of each phonetic symbol there is set forth two or three, presumably common words. The letters in these words, which are sounded like the corresponding phonetic symbol are set out in bold face type. Words containing different letter groupings that are identically sounded are not necessarily set forth.

As noted above, the arrangement is an alphabetical listing of phonetic symbols. There is no separating of these symbols into distinguishable and separate groups of consonant sounds and vowel sounds.

The arrangement is such that only one sound, consonant or vowel, per word is emphasized. There is no way of quickly sounding accompanying letters in the word. Reference has to be made to other points in the guide or to the body of the dictionary where the particular word is located to find out how these other letters would be sounded. This is a relatively slow process.

In addition to the problems associated with first coming to an understanding of the pronunciation of letters and groupings of letters, there is the added problem that the instructor faces when it is desired to quiz the students. Heretofore, the instructor has had to stand before the class, verbalize the word, and then require the students to write the word which reflects the vocalization.

This obviously is a wasteful use of the instructor's time — the latter being better spent in tutoring a child with a particular learning disability, or otherwise.

Thus a need arises for a means for independently testing the students as to their comprehension of the various sounds and how they are expressed by the written word.

Similarly, when an instructor is primarily concerned with the students' spelling abilities, in the past, the instructor has had to vocalize the word and thereafter require the student to write the corresponding written word. Again, the teacher must actively participate in the spelling test, and thus valuable time is wasted.

It is therefore a primary object of this invention to provide a system of instructional charts which enable the user to associate combined sounds with the written word and thereafter allow for self-test by a student as to his comprehension of what he has been taught both as to sound associations and spelling.

It is another object of this invention to provide a system for teaching word pronunciation wherein the proper sounding by the student is guaranteed without question.

SUMMARY OF THE INVENTION

Towards the accomplishment of this and other objects which will become apparent from a study of the drawings and accompanying description, there is disclosed a system of instructional charts, a first one of which includes a carrier having disposed thereon first indicia, viz. character representations for various vowel sounds. The first indicia are disposed along one edge of the carrier. Positioned along a second edge of the carrier, at right angles to the line of first indicia, is second indicia which comprises character representations for various consonant sounds.

At the juncture of imaginary columns and rows emanating from each of the character representations for both the vowel and consonant sounds are third indicia. These are words or parts thereof which are sounded in whole or in part by the combination of the vowel and consonant sounds depicted by the respective letter and character representations of the first and second indicia.

A grid system in the form of fourth indicia can be disposed on the carrier to further delineate the particular junctures.

Means for sectioning the charts into meaningful subcategories are disclosed as are the use of additional indicia to facilitate pronunciation of multiple sound words and other words containing letters and letter groupings having relatively unusual soundings.

Further, the system includes a second chart which is identical to the first chart described above except that there are no entries at particular junctures. This chart is used by a student together with an initial instruction by the teacher, for purposes of recording at the various junctures, or on a separate sheet of paper, words that the student understands, reflect the combined sounds of the respective vowel and consonant.

A third chart of the system comprises the basic format of the first and second chart, i.e. the disposition of the vowel and consonant sounds along orthogonal edges, but modifies it to include at the junctures of the columns and rows, letter and character representations of additional vowel or consonant sounds. The instruction for the use of this chart calls for the student to combine the sounds at the end of the respective column and row with the sounds represented by the letters and characters set forth at the particular juncture and to then write a word which reflects this combined sound.

BRIEF DESCRIPTION OF THE DRAWINGS

FIGS. 1 through 15 are various sectional plan views reflecting different embodiments of the present invention.

DESCRIPTION OF THE PREFERRED EMBODIMENT

FIG. 1 illustrates one particular adaptation of the first type of chart comprising the invention. The chart includes a carrier 10, such as cardboard, paper or the like, upon which is disposed various indicia.

A first one of said indicia corresponding to the character representation of standard pronunciation symbols for vowels, are disposed in a first line 12 along the top edge of the carrier. These symbols are, typically, the standard symbols found in a Merriam-Webster or other type dictionary. The line, 12, may contain all or only part of the symbols as suits the purposes of a particular instructional chart.

Disposed in a second line 14 upon the carrier are second indicia which include the character representation of a plurality of standard pronunciation symbols for consonants. Line 14 is orthogonal to line 12 and in the illustration depicted, would form a vertical line running the length of the carrier along its left-hand edge.

Positioned at the juncture of imaginary columns or rows, each of said columns or rows emanating respectively from one of said character representations of the first indicia along line 12 and from one of the character representations of the second indicia along line 14 is various third indicia such as 16, 18 and 20. These indicia comprise the letter representations of various words (in some cases parts of words as will be seen hereinafter), which are sounded by the combination of the vowel sound appearing directly above the word in line 12 and the consonant sound appearing directly to the left of the word in line 14. Thus, for example, the word "say" is seen to be a combination of the consonant sound s and the vowel phonetic sound a.

Similarly, the third indicia at point 18, comprising the letter representation of the word "mere" is sounded by combining the consonant sound m and the vowel sound "ear."

In certain cases, the chart contains blank spaces such as 20. This indicates to the user that there is no word in the language which is sounded by the combination of the consonant and vowel sound.

The user of the chart depicted in FIG. 1 in order to vocalize a certain word would sound, first of all, the consonant sound at the left-hand edge and then the vowel sound appearing above the particular word. This order of sounds is inherent in the chart presentation and appeals to the natural tendency in English and other languages, to read from left to right.

In the basic form of the invention, as shown in FIG. 1, pronunciation of the word entries at various junctures is guaranteed because there are only the two sounds involved - the consonant sound at the left-hand side and the vowel sound at the top. Thus, for example, the learner can put the m sound 22, with the vowel sounds $\bar{a}, \bar{e}, \bar{\imath},$ and $\bar{o}$ and say the words "may" "me", "my" and "mow."

Or, if it is deemed advisable to study one vowel at a time, the user can combine his consonant sounds s, l, m, n, f and r with the vowel sound "ā" and pronounce the following words: "say," "lay," "may," "nay," "Fay" and "ray." Thus, it can be seen, that there are two reading and pronunciation experiences involved — a horizontal one as well as a vertical experience and that a user can, by considering a number of horizontal entries, probably encounter some that are familiar to him and which will guide him in pronouncing other entries having the same sound (consonant or vowel) but which are unfamiliar to him.

To provide as wide an experience as possible for the user, proper names such as 26 and 28, and uncommonly used words such as 29 are included. Foreign language words can also be employed.

As a means for organizing the words in a proper relationship to the consonant and vowel sound representations, a fourth indicia in the form of a rectangular grid 30, is disposed upon the carrier. The letter and character representations of the first indicia in line 12, are disposed juxtaposed respective columns of the grid system while each of the letter and character representations of the second indicia in line 14 are juxtaposed to respective lines of spaces in the grid system. Because of the right angle orientation between lines 12 and 14, these columns and lines are also at right angles to each other. This use of a grid system enables the user to immediately focus on a word which is sounded by the consonant and vowel sound at the end of the respective line and column.

Words are arranged at each of the spaces defined by the grid system such that in each column, the letter representations of the vowel sound at the head of the column in each word are aligned. For example, the words "sigh," "lie," "my," "thy" and "fie" are aligned such that the various letter combinations in each of the words sounded by the $\bar{\imath}$ vowel sound are aligned vertically. This makes it clear for a user of the chart to know which letter(s) and letter groupings in a word represent the particular vowel sounds, making it easy to compare spelling variations of a particular vowel sound.

Further, the grid system is sectioned-off by section lines shown typically at 32 and 34. This sectioning on a particular chart as well as similarly constructed charts enables the user to scan between a first and second or other charts identically sectioned to immediately identify those groupings of words on each chart which have the same consonant or vowel sounds. Sectioning of the chart along the vertical to group vowel sounds is also done although not shown.

In certain cases, additional indicia such as a question mark or an exclamation point as employed at 36 and 38 can be used where pratical to aid the user's comprehension although such comprehension is not, generally, the purpose of charts of the invention but rather is absorbed through conversation and discussion between the user and the teacher.

FIG. 2 shows an adaptation of the present invention wherein the basic chart of FIG. 1 is expanded to include multiple entries at each juncture wherever possible. As with the chart of FIG. 1, the letter representation in each word of the particular vowel sound at the head of the column is aligned, from word to word from juncture to juncture.

Thus, words such as "see" and "sea" at juncture 39 would be aligned in a vertical column with words "lee" and "Leigh" at juncture 40 where the consonant sound $l$ and vowel sound $\bar{e}$ would meet. At each juncture, the letter representations in each word which correspond to the particular vowel sound, would also be aligned again, making it easy to compare and recognize the spelling variations of the particular vowel sound.

FIG. 3 is much like FIG. 1 except that the line of consonant sounds 42, is disposed along the right edge of the carrier. Again, by instruction or because of one's inherent tendency in various languages including English to read from left to right, the user would first sound the vowel sound at the top of the carrier and then the consonant sound along the right edge in order to sound the particular word at a given juncture. Thus, for example, the word "all" would be sounded by first vocalizing the $aw$ phonetic vowel sound at the top of column 44 and then the $l$ consonant sound at the right of line 46.

From such an arrangement, profitable comparisons can be made by the student. For example, silent vowel letters are shown to play a large part in the spelling of the long vowel words, for instance "oil" and "aim" as compared to "Al" and "am".

Punctuation marks such as at 48 again can be used to further comprehension. Further, in addition to the whole words which are positioned at most junctures, endings of words such as "ong" and "oing" would be positioned to illustrate the possible combinations of the vowel-consonant sounds at those junctures. A suitable symbol such as parentheses marks as, for example, at 50 and 52 would indicate to the student that such entries were not complete words but rather only parts thereof, further assisting him in comprehending the subject matter of the charts.

The chart of FIG. 3 can be used advantageously with the chart of FIG. 1 to facilitate the learning process for people suffering from a dyslexia problem. For example taking words from the chart of FIG. 1 which begin with consonant $s$ followed by $a$ and comparing those words with the words of the chart in FIG. 3 which begin with the vowel sound $\bar{a}$ and then followed by the consonant $s$, such as say ... ace and may ... aim, etc., the handicapped student is able to determine that the orientation of the consonants and vowels within a word produce different sounds. This has an extremely beneficial result for such problem readers and of course, students in general.

FIG. 4 is an adaptation of FIG. 3 showing the multiple entries at the appropriate junctures of vowel and consonant sounds. Again, as with the chart of FIG. 2, the vowels in each of the words are vertically aligned to facilitate pronunciation and recognition of the various ways that such sounds appear in the language. Again, like FIG. 3, profitable experiences can be had from comparing various columns.

FIG. 5 is an extension of the concepts of FIG. 1. Here, an additional sound is added at the end of the consonant-vowel sound combination as typified by the basic 2-sound chart. Thus the words at the particular junctions are a composite of the consonant-vowel-consonant sound. The first consonant sound is represented by the letter and character representation in column 54. The vowel sound is the pronunciation of the phonetic symbol appearing in line 56. The final consonant sound as represented for example by the letters "fe" in the word "safe," 58, might appear along with the other consonant sounds in column 54 or explained by certain additional indicia such as 60, 62 or 64. These additional indicia such as 64, having obvious sounds or otherwise explainable to the user, would connote specific sounds or even the absence thereof. For example, character 60, i.e., a "." above the $g$ would be specified as indicating the $j$ sound. The "." below a letter such as at 62 would be designated as representing a silent letter.

These characters, 60, 62 and 64 would be in close relationship to the respective letters so as not to mislead the user as to which letter in the word is to be sounded accordingly. Similarly, indicia 66, i.e, $f$ attending the letters $gh$ in words such as "laugh," would be identified (if need be) as the particular sound associated with those two letters as arranged in that word. Of course, the chart of FIG. 5 would include multiple entries at the appropriate junctures as illustrated by the embodiments discussed above.

FIG. 6 is an extension of the basic chart shown in FIG. 3 and illustrating the additional principles of FIG. 5.

Here entries at the various junctures constitute words having three different sounds, i.e. consonant-vowel-consonant. However, in accordance with the form set out in FIG. 3, the vowel and ending consonant sounds are predictable by the column and line headings. The initial consonant sound would be ascertained from one of the phonetic sounds disposed along the line at the right-hand edge or explained by the additional indicia positioned in an appropriate relationship to the letters constituting that first consonant sound. Thus, for example, the indicia at 68, i.e., a "." below a letter, as defined with respect to FIG. 5, would constitute a silent letter informing the student that such a letter is not to be sounded in the pronunciation of the word. The student would then know to first sound the $n$ in that word and thereafter sound the remaining vowel and consonant sounds to come up with the proper pronunciation of the word "knife." Again, multiple entries can be located at the junctures enhancing the potential of the basic chart.

FIG. 7 expands the basic principles set forth above. Combined consonants which appear in our language are now positioned in column 70 along the left-hand edge of the carrier. The vowel sounds are again disposed along the top edge of the carrier in line 72. In the basic chart involving the combined consonants, beginning double and triple consonant sounds are introduced followed by a single vowel sound. For example, "sleigh," "Smee," "flow," etc. Sound combinations which do not make words until an additional sound is added have suitable indicia associated therewith so as to signify that the entity is in fact only part of a word. Thus, for example, parenthetical marks, 74, bracket the partial word entry "smi" to indicate this fact. The student as a work exercise can add various consonant sounds to the partial word to see the potential thereof and arrive at words that he might recognize.

FIG. 8 extends the basic concepts of FIG. 7 to include an additional consonant sound after the combined consonant and vowel sounds. Additional indicia such as the small z 76, placed in close relationship to the letters representing this last consonant sound would provide a key to the user for properly pronouncing that ending.

Figures 9, 10, 11, 12:
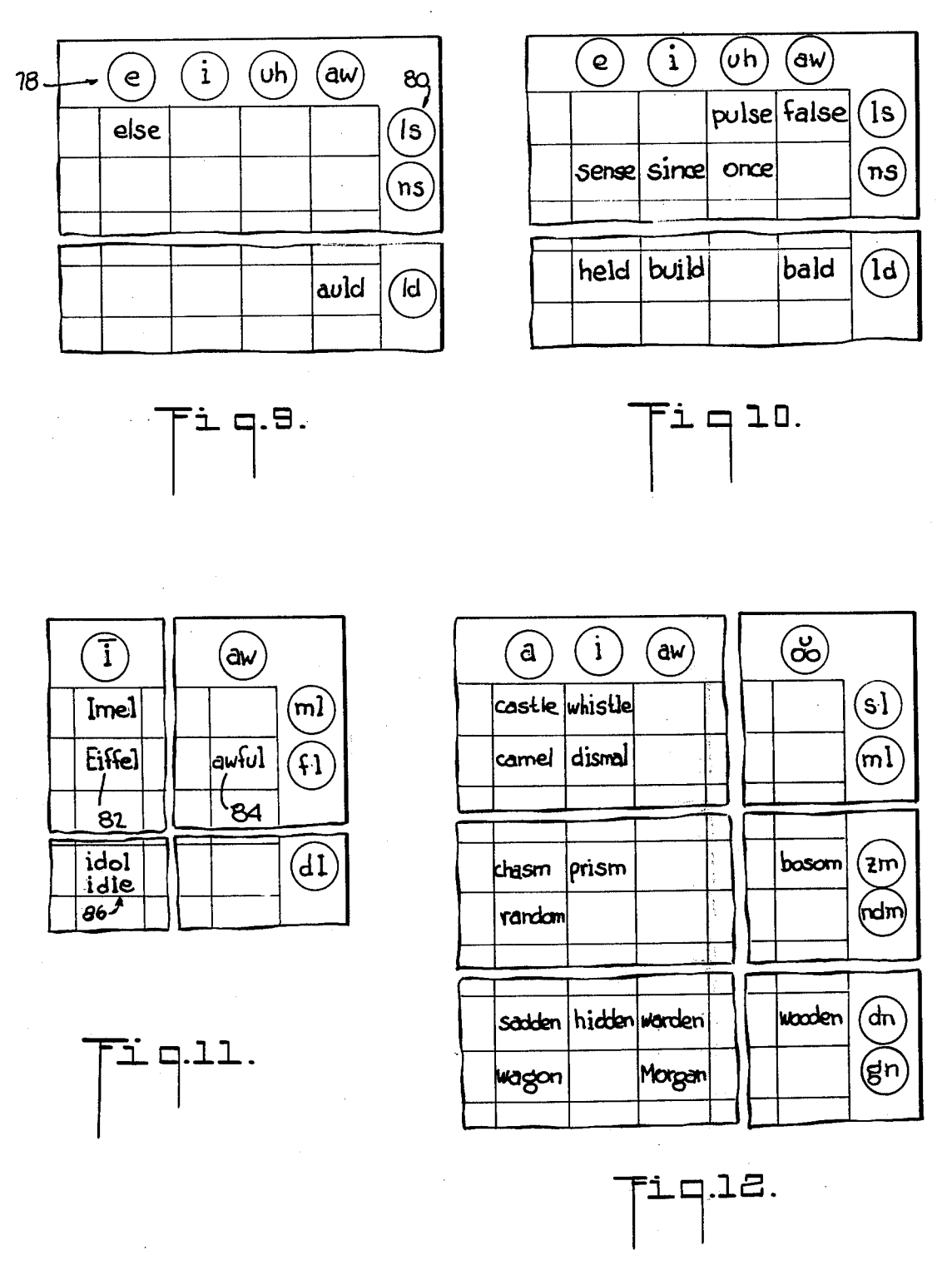

FIG. 9 discloses a chart wherein the combined consonants appear at the end of a word. The vowel sounds are again set forth in a line 78 along the top edge of the carrier and the blending consonant sounds disclosed along the right-hand edge of the carrier in a column 80. Words beginning with the vowel shown in the respective column headings and ending with the combined consonant sounds at the right-hand side of the corresponding line are set forth at the various junctures.

FIG. 10 depicts a chart which adds various single and multiple beginning consonants sounds to the double sounds typified by the chart of FIG. 9. The student would know to sound the added beginning consonant sound by referring to some of the basic charts described above or by additional indicia, such as item 60, 62 and 64, shown and identified in FIG. 5.

FIG. 11 is an adaptation of the principles of the invention wherein the word entries 82, 84, etc. begin with a vowel sound shown at the top of the column and end with the multiple consonant sound shown at the extreme right-hand side of the grid. However, these consonants sounds are not the smooth blending type shown in FIG. 9 but rather produce a "schwa" sound between the final two consonant sounds. For example, "Eiffel" is pronounced $\bar{i}$ - fuhl. The word entries at the various junctures, may or may not have a vowel letter between the final two consonant sounds such as "idol" and "idle" at juncture 86.

FIG. 12 is an extension of the principles of FIG. 11 where, for the most part, single consonant beginning sounds have been added to the vowel-multiple consonant ending sounds which do not blend smoothly but produce a "schwa" sound between the final two consonants. Again, the pronunciation of the initial consonant sound would be ascertained by referral to a more basic chart containing single consonant sounds or from additional indicia, not shown in this chart, placed on the chart which would suggest the appropriate pronunciation of that beginning sound.

As noted earlier, one of the major drawbacks associated with the present method of instructing students in the area of word pronunciation and spelling is the necessity for the teacher to continually participate with the student at all stages of the learning process. The teacher not only must explain these sounds to the student in order to initially familiarize him with the various letter or letter groupings associated therewith, but the instructor must also actively participate in the testing of the student's comprehension of the previously taught principles. This is an unwarranted use of the teacher's time and it would be desirable to free him of this chore so that it might be more profitably spent in other areas, for example, helping the slower students in the group.

Therefore, as part of the overall instructional system described, there is provided a testing chart. For each of the charts previously described, and of course, any others that would be compiled, there is a corresponding testing chart of the construction shown in FIG. 13.

The test chart includes a line of pronunciation symbols for vowels at 87 and also a line of consonant pronunciation symbols at 88. The particular symbols set out in each line would be identical to the arrangement on the basic chart with which the test chart is used. At the intersection of the respective columns and lines emanating from the phonetic symbols, there are found blank or completely filled-in spaces, 90 and 92. The student either verbally or by an accompanying instruction booklet wherein is contained the particular words which may be entered on a given chart, is directed to write in each of the blank spaces, words which are sounded by the combined consonant and vowel sounds at the end of the corresponding row and column. Again, the student intuitively or by direction combines the sounds in the proper sequence.

In initial testing, the student's ability to identify words which reflect the combined sounds is facilitated not only by the instruction booklet which would contain only those words which can be inserted, but also by the fact that the completely filled-in spaces, 92, eliminate those particular locations as possibilities. Of course, as the student becomes more proficient in his comprehension of the language, a further test of his comprehensive ability will include the use of a testing chart which comprises only blank spaces at the various junctures — not employing the filled-in spaces. In that situation the student is truly challenged to observe and conclude that the combined consonant vowel sounds for those particular junctions do not represent any written words in the language.

Once the student has filled-out the test chart completely, the teacher still need not become involved in the testing function. The completed test chart and its counterpart of the instructional charts could be retained by the student himself to correct his own work or be given to either another student or a teacher's aide who could thereafter correct the booklet and grade the student. Thus the teacher is freed to spend his time more advantageously, elsewhere.

As just described the test chart is used initially in the student's instructional program to identify his comprehension of various letters as they appear in words. The approach to using the chart was to have the student sound the consonant and vowel sounds in their proper relationship and then refer to a listing of all the possible entries on the chart to find that word which represented to him the proper letter arrangement giving rise to the combined sounds. Then the entry was made. The immediate concern for such use of the chart is not to test the student's comprehension of the spelling of words but rather the sounds attributed to letters and groups of letters. This is sometimes referred to as a "decoding" process.

A second use of the chart, however, allows the instructor to test the student's spelling ability — an "encoding" process. Previously, when a teacher gave a spelling test, the only way that such a test could be performed, was to have the teacher first vocalize the word and then have the students write down what each believed to be the proper letter arrangement reflecting the teacher's verbalization. Of course, this presumes the students have already been exposed to the proper spelling and accompanying sounds. As noted earlier, this consumes a significant amount of the teacher's time.

By employing the test chart depicted in FIG. 13 and other comparable charts whereupon there is disposed consonant and vowel sounds in a predetermined relationship, a student, presuming that he has advanced to a point in his comprehension of the language where he can vocalize the consonant and vowel sounds, can for each juncture, combine the corresponding sounds to verbalize the sound himself. Having done so, he then spells the word as he believes such to be done and enters it at the appropriate juncture. Thus, the student becomes his own "teacher" for purposes of testing himself.

The teacher is also relieved from correcting the test paper. By referring to the corresponding basic chart on FIGS. 1 through 12, or others, the student himself, or another student or teacher's aide can provide the necessary checking of the former's performance leaving the teacher to work in more fruitful areas.

FIG. 14 shows a form of the test chart which is employed when the student has progressed to more complex words. The chart includes a line of consonant phonetic symbols 94 and a line of vowel phonetic symbols 96. In this form of the chart the area of the junctures formed by the respective columns and rows is enlarged to now contain additional phonetic symbols 98. The physical relationship between an individual consonant and vowel symbol in lines 94 and 96 respectively and as well the additional phonetic symbols 98 are such that in proceeding from left to right across the page the user first encounters the consonant symbol in line 94 then the vowel symbol in line 96 and finally respective ones of the additional phonetic symbols at point 98 at each juncture. By intuition or by instruction the student knows to combine the sounds in this left to right fashion.

Again, this form of chart is useful in two ways. For example, if it is desired to test a student's comprehension of how certain letter arrangements in words are grouped to form the various sounds represented by the phonetic symbols, he would be provided with a list of words and instructed to enter, in this case on a separate sheet of paper, those words which correspond to the combination of the consonant vowel consonant sounds at each of the junctures. Thus, for example, at the juncture 100, the student would sound the phonetic symbol s, then the phonetic symbol a and finally, in turn, each of the consonant phonetic symbols, l, l, m, etc. and would write on a separate sheet of paper, for instance, the words "sail," "sale," "same," etc. By so doing, he is self-testing his ability to relate various letter and letter arrangements to particular phonetic symbol combinations.

Also, this same form of chart can be used to self-test the student's spelling ability by requiring that he write for each of the sound groupings represented by the phonetic symbols corresponding words.

FIG. 15, having the same basic format as FIG. 14 but listing suitable words at the juncture 100, would be used initially to demonstrate to the student words which combine the various consonant and vowel sounds, and thereafter provide a check for the student's work.

Optimally, the instruction charts shown in FIGS. 1 through 12 and 15 and others having a similar construction, are used in conjunction with the test charts similar in nature to those in FIGS. 13 and 14. Of course, the instruction charts can be used independently of the latter where the teacher believes he must participate in a more direct manner in the testing function.

Although for purposes of illustration, the consonant sounds have been depicted as running vertically along the length of the carrier and the vowel sounds horizontally, it's apparent that the reverse of this, viz. vowel sounds along the vertical edge and consonant symbols along the horizontal, would be an obvious extension of the basic principles of the invention.

The significant advantage associated with the relationship of indicia to the carrier in this invention results from the alignment both in a vertical and horizontal manner of various words related by their common usage of either the vowel sound at the top of a column or the consonant sound at the beginning or end of a line. The grid framework described facilitates and guarantees the pronunciation of particular words by providing a ready, easily recognized relationship, between that word and known words having identical vowel and consonant sounds.

Of course it is to be understood that the invention extends not only to the English language as described but also to other languages which employ phonetic symbolization to facilitate an understanding of the sounds associated with the words therein.

Other variations of the arrangements described above will be obvious to those familiar with this art and are considered to be within the scope of the invention as described in the appended claims.

What is claimed is:

1. An instructional chart for teaching word pronunciation comprising:
   a. a carrier;
   b. first indicia disposed upon said carrier, said indicia including the character representation for a plurality of pronunciation symbols for vowels; a character representation heading an imaginary column or row emanating therefrom;
   c. second indicia disposed upon said carrier, said indicia including the character representation of a plurality of pronunciation symbols for consonants; a character representation heading an imaginary row or column emanating therefrom; and
   d. third indicia disposed upon said carrier at the juncture of at least one imaginary column and row; said third indicia comprising the letter representation of at least one entry including a word which is sounded by the combination of the vowel sound represented by the respective character representation of said first indicia and the consonant sound represented by the respective character representation of said second indicia, whereby the user of said chart is guided in his understanding of the pronunciation of said entry.

2. The instructional chart of claim 1 further comprising:
   fourth indicia in the form of a grid disposed upon said carrier such that each of said character representations of said first indicia are disposed juxtaposed a line of the spaces formed by said grid on said carrier and such that each of said character representations of said second indicia are disposed juxtaposed to a line of the spaces, said line of spaces juxtaposed to said first indicia at right angles to said line of spaces juxtaposed to said second indicia.

3. The instructional chart of claim 1 wherein at least two entries are disposed at a juncture(s) of an imaginary row and column, said two entries comprising two words having the same vowel or consonant sound.

4. The instructional chart of claim 1 further comprising fifth indicia including means for sectioning said chart into subsections, whereby the user of said chart is further assisted in his understanding of the pronunciation of entries within each subsection by comparison to other charts which are identically subsectioned and which contain the same disposition of said first and second indicia upon their respective carriers.

5. The instructional chart of claim 1 wherein at least one of the entries further includes letters sounded by an additional vowel or consonant sound besides the vowel and consonant sound represented by the respective letter and character representations of said first and second indicia.

6. The instructional chart of claim 5 further comprising sixth indicia positioned in close relationship to the letters sounded by the additional vowel or consonant sound, whereby said sixth indicia assists the user of said chart in pronouncing the additional vowel or consonant sounds.

7. The instructional chart of claim 1 further comprising:

seventh indicia positioned on said carrier in a predetermined relationship to said entries comprising letter representations of parts of words, said seventh indicia enabling said user to distinguish said parts of words from whole words.

8. The instructional chart of claim 1 wherein said third indicia are disposed upon said carrier at, at least two of said junctures aligned in one of said columns, whereby the user of said chart is guided in his understanding of the sound attributed to said character representations of the particular consonant or vowel sound as represented by letters in said words.

9. The instructional chart of claim 1 wherein said third indicia are disposed upon said carrier at, at least two of said junctures aligned along one of said rows, whereby the user of said chart is guided in his understanding of the sound attributed to said character representations of the particular consonant or vowel sound as represented by letters in said words.

10. An instructional chart for teaching word pronunciation comprising:
 a. a carrier;
 b. first indicia disposed in a first line upon said carrier, said indicia including the character representation of a plurality of standard pronunciation symbols for vowels; a character representation heading an imaginary column or row emanating therefrom;
 c. second indicia disposed in a second line upon said carrier at substantially right angles to said first line, said second indicia including the character representation of a plurality of pronunciation symbols for consonants; a character representation heading an imaginary row or column emanating therefrom; and
 d. third indicia disposed upon said carrier at the juncture of at least one imaginary column and row, said third indicia comprising the letter representation of at least one entry including a word which is sounded by the combination of the vowel sound represented by the respective character representation of said first indicia and the sound represented by the respective character representation of said second indicia, whereby the user of said chart is guided in his understanding of the pronunciation of said word.

11. A chart for testing a student's comprehension of word pronunciation and spelling comprising:
 a. a carrier;
 b. first indicia including the character representation of a plurality of pronunciation symbols for vowels; a character representation heading an imaginary column or row emanating therefrom;
 c. second indicia disposed upon said carrier, said second indicia including the character representation of a plurality of pronunciation symbols for consonants; a character representation heading an imaginary row or column emanating therefrom; and
 d. an area disposed upon said carrier at the juncture of the imaginary columns and rows, which area is open to accept at least one word entry defined by the combination of the vowel sound represented by a character representation of said first indicia and a consonant sound represented by a character representation of said second indicia whereby the student is instructed to enter upon said carrier at the location of each of said blank spaces, or upon a separate sheet, the letter representation of a word which is sounded by the combination of the vowel sound represented by the respective character representation of said first indicia and the consonant sound represented by the respective character representation of said second indicia.

12. The testing chart of claim 11 wherein said carrier further includes a closed area at the juncture of an imaginary column(s) and row(s) said area being incapable of accepting a word entry, whereby the student understands that there are no words or parts thereof which are sounded by the corresponding vowel and consonant sounds for said closed area.

13. A chart for testing a student's comprehension of word pronunciation and spelling comprising:
 a. a carrier;
 b. first indicia disposed upon said carrier; said indicia including the character representation of a plurality of pronunciation symbols for vowels; a character representation heading an imaginary column or row emanating therefrom;
 c. second indicia disposed upon said carrier, said second indicia including the character representation of a plurality of pronunciation symbols for consonants, a character representation heading an imaginary row or column emanating therefrom; and
 d. third indicia disposed upon said carrier at the juncture of at least one imaginary column and row, said third indicia comprising character representations of at least one pronunciation symbol for a vowel or consonant or combination thereof,
 whereby the student is instructed to enter upon said carrier at the location of each of said junctures, or upon a separate sheet, the letter representation of the words, which are sounded by the combination of the vowel sound represented by the respective character representation of said first indicia and the consonant sound represented by the respective character representation of said second indicia and the sounds represented by the respective character representations of said third indicia at each juncture.

14. An instructional system for teaching and testing word pronunciation and spelling comprising:
a. the chart of claim 1, and
b. the chart of claim 11.

15. The system of claim 14 further comprising the chart of claim 14.

16. An instructional system for teaching and testing word pronunciation and spelling comprising:
a. the chart of claim 1, and
b. the chart of claim 13.

* * * * *

UNITED STATES PATENT AND TRADEMARK OFFICE
CERTIFICATE OF CORRECTION

PATENT NO. : 4,030,211

DATED : June 21, 1977

INVENTOR(S) : Edward J. McGinley

It is certified that error appears in the above-identified patent and that said Letters Patent are hereby corrected as shown below:

Column 3, line 59, the word "phonetic" should be inserted after the word "vowel".

Column 4, line 10, "a, e, i, o, should be -- "a", "e", "i" and "o" --.

Column 4, lines 13 and 14, "s, l, m, n, f and r" should be -- "s", "l", "m", "n", "f" and "r" --.

Column 4, line 49 "ī" should be -- "ī" --.

Column 5, line 13, "l and vowel sound ē" should be -- "l" and vowel sound "ē" --.

Column 5, line 28, "aw" should be -- "aw" --.

Column 5, line 29, "l" should be -- "l" --.

Column 5, line 32, "oil" should be -- "ail" --.

Column 5, line 49, "s followed by a" should be -- "s" followed by "a" --.

Column 5, line 51 and 52, "ā and then followed by the consonant s" should be -- "ā" and then followed by the consonant "s" --

Column 6, line 14, "g" should be -- "g" --.

Column 6, line 15, "j" should be -- "j" --.

Column 6, line 21, "f" should be -- "f" --.

UNITED STATES PATENT AND TRADEMARK OFFICE
CERTIFICATE OF CORRECTION

PATENT NO. : 4,030,211
DATED : June 21, 1977
INVENTOR(S) : Edward J. McGinley

It is certified that error appears in the above-identified patent and that said Letters Patent are hereby corrected as shown below:

Column 6, line 22, "gh" should be -- "g̲h" --.

Column 6, line 46, "n" should be -- "n̲" --.

Column 7, line 4, "z" should be -- "z̲" --.

Column 7, line 32, "ī-fuhl" should be -- "ī-fuhl" --.

Column 9, line 42, "s, then the phonetic symbol a" should be -- "s", then the phonetic symbol "a" --.

Column 9, line 43, "1,1,m" should be -- "1", "1", "m", --.

Column 14, line 2, "claim 14" should be -- claim 13 --.

Signed and Sealed this

Eighteenth Day of October 1977

[SEAL]

Attest:

RUTH C. MASON
Attesting Officer

LUTRELLE F. PARKER
Acting Commissioner of Patents and Trademarks